(12) United States Patent
Buchheit et al.

(10) Patent No.: US 7,143,297 B2
(45) Date of Patent: Nov. 28, 2006

(54) PROCEDURE FOR THE PROTECTION OF COMPUTER SOFTWARE AND/OR COMPUTER-READABLE DATA AS WELL AS PROTECTIVE EQUIPMENT

(75) Inventors: Marcellus Buchheit, Karlsruhe (DE); Oliver Winzenried, Karlsruhe (DE)

(73) Assignee: Wibu-Systems, AG, Karlsruhe (DE)

( * ) Notice: Subject to any disclaimer, the term of this patent is extended or adjusted under 35 U.S.C. 154(b) by 549 days.

(21) Appl. No.: 09/938,023

(22) Filed: Aug. 22, 2001

(65) Prior Publication Data

US 2002/0031222 A1    Mar. 14, 2002

(30) Foreign Application Priority Data

Aug. 24, 2000    (EP)    ................... 00118372

(51) Int. Cl.
*H04L 9/00*    (2006.01)
*H04L 9/32*    (2006.01)
*G06F 12/14*    (2006.01)

(52) U.S. Cl. .................. 713/193; 713/171; 713/194; 726/26

(58) Field of Classification Search ................ 713/193, 713/194, 200, 171; 726/26
See application file for complete search history.

(56) References Cited

U.S. PATENT DOCUMENTS 5,473,692 A    12/1995    Davis
5,757,907 A    5/1998    Cooper et al.
5,987,134 A    11/1999    Shin et al.
6,134,659 A *    10/2000    Sprong et al. .............. 713/190
6,189,146 B1 *    2/2001    Misra et al. ................. 717/177
6,219,652 B1 *    4/2001    Carter et al. .................. 705/59
6,233,567 B1 *    5/2001    Cohen ......................... 705/59
6,411,941 B1 *    6/2002    Mullor et al. ................. 705/59
6,574,612 B1 *    6/2003    Baratti et al. ................. 705/59
2004/0243815 A1 *    12/2004    Tsukamura ................. 713/193

FOREIGN PATENT DOCUMENTS

WO    WO98/42098    9/1998

* cited by examiner

*Primary Examiner*—Christopher Revak
*Assistant Examiner*—Kaveh Abrishamkar
(74) *Attorney, Agent, or Firm*—Gardere Wynne Sewell LLP

(57) ABSTRACT

A procedure for the protection of computer software and/or computer-readable data against unauthorized use includes the encoding of the software by the licenser dependent on license parameters, the storage of the software at the licensee, the encoded transmission of the license parameters from the licenser to the licensee, and the automatic decoding of the software dependent on the stored license parameters during the use of the software by the licensee. The encoding of the software is initialized dependent on a secret Firm Key (FK) freely selected by the licenser. The encoding of the transmission of license parameters occurs dependent on a secret Private Serial Key (SK). The decoding of the software or data is initialized dependent on the Firm Key (FK) selected by the licenser. A protective device is linked to the computer of the licensee and includes a memory for the storage of license parameters of different licensers.

14 Claims, 8 Drawing Sheets

KEYS AND DATA AT THE PRODUCER

| COMMON KEY (CK), CALCULATED THEREFROM FIRM COMMON KEY (FCK) |
|---|
| BOX KEY (BK), MAKES AVAILABLE PUBLIC BOX KEY |
| VALIDATION KEY (VK) |

FIG. 2a

KEYS AND DATA AT THE LICENSER

| FIRM CODE (FC) |
|---|
| FIRM COMMON KEY (FCK) |
| FIRM KEY (FK) |
| BOX KEY (BK) |

FIG. 2b

PROCEDURE FOR THE PROTECTION OF COMPUTER SOFTWARE AND/OR COMPUTER-READABLE DATA AS WELL AS PROTECTIVE EQUIPMENT

BACKGROUND

The invention involves a procedure to protect computer software and/or computer-readable data against unauthorized use as well as a protective device for use in such a procedure.

Computer software, documents, and data with content that are to be protected against illegal dissemination are primarily sold individually as a package. In part technical measures are employed against unauthorized use, including in particular pirate copies, whereby the measures are either pure software solutions or a hardware protection, so-called dongle.

Problematic in any kind of security measures against unauthorized use is that individually adjusted security measures are required for every product. New distribution paths such as ESD (electronic software distribution), for example over the Internet, are made much more difficult because along with the protected computer program or protected data it is always necessary to prepare and provide individual hardware and software. The licenser therefore has additional costs just for the security measures. The licensee has a one-time procurement price and risks making a bad investment. Payment according to the intensity of use is not customary, because it cannot be measured technically.

The high-grade procedures available today to protect software on the basis of the encoding of documents, program code, or resources are not adequate for future security requirements, especially for widespread and accordingly reasonably priced software as well as their secure accounting as a function of use.

The currently available Private Key Tokens that are used for authentication and that can store certificates, for example in accordance with ITU-norm X.509v3, do meet high security requirements but permit only the storage of a few certificates. The simultaneous use of many differently protected programs or data with individual encoding and accounting is also not foreseen here.

Because every individual software product requires its own protective procedure that in any case is associated with substantial additional costs, the overwhelming share of computer software and/or computer-readable data is still disseminated without effective copy protection. The originators or licensers thereby miss receiving large sums of unpaid license fees.

For the future use of many different computer programs or computer-readable data, especially also from different licensers and utilizing new online marketing paths, new protective procedures are therefore needed that secure the income of licensers and correspond to increased security requirements.

U.S. Pat. No. 5,826,011 describes an electronic security device developed as hardware for the protection of computer software in the installation, which is linked to the computer of the user. This electronic security device includes different secret installation data that are required in the installation of the protected program.

U.S. Pat. No. 5,805,802 describes a module for the protection of software in a computer network, including a microprocessor for the implementation of controlled access to the software, an interface for linking with a network server, a programmable memory in which a use-restricting code is stored, and a device for the processing of this use-restricting code and a current user number.

WO 00/20948 describes a copy protection system that combines a signature procedure with a coding or encoding procedure using variable keys.

Finally the company publication "WIBU-KEY—the Convincing Concept on the Theme of Copy protection" from the applicant himself, published in 1999 by WIBU-SYSTEMS AG, describes a protective device developed as a hardware supplement for linking a copy-protected software to the computer of the licensee. Here use is made of a procedure in which the software to be protected is encoded at the licenser and again decoded at the licensee. The encoding depends upon three parameters: the Firm Code that is given by producer and issued just once for each licenser; the User Code that the licenser is free to set; and finally the Selection Code that serves to select one of more than 4 billion encoding variants for each license entry. The Firm Code and the User Code are programmed into the protective device by the licenser. The Selection Code is sent to the protective device at the disposal of the licensee in the initializing of the encoding and is not stored. The Selection Code, prepared by the licenser, is included in the protected data or the protected software.

Detrimental in the last-named protective procedure is the fact that the licenser is dependent on a fixed Firm Code provided by the producer of the procedure or of the protective device (box). This results in a certain dependency of the licenser upon the producer of the procedure or of the box, which on the one hand restricts the licenser whereas from the point of view of the licenser it leads to security that is not yet optimal. Furthermore, a substantial advantage is that every licenser requires a certain fixed Firm Code, which for the licensee, that is, the end customer of the software, may mean that in using the software of different licensers he must employ several protective devices.

SUMMARY OF THE INVENTION

Hence the invention is based on the technical problem of making available an improved system for the protection of computer software and/or computer-readable data against unauthorized use that makes possible simultaneous use by many licensers for many products at a time independently of each other.

The solution of this problem is based on a procedure in which the software or the data of the licenser is protected through individual encoding depending on license parameters.

The problem is also solved in that the encoding of the software or data is initialized at the licenser dependent on a secret Firm Key freely choosable by the licenser, that the encoding of the transmission of the license parameters from the licenser to the licensee takes place dependent on a secret Private Serial Key, and that the decoding of the protected software or data is initialized at the licensee dependent on the Firm Key selected by the licenser.

The advantage of the procedure in accordance with the invention is in the fact in particular that many mutually independent license parameters coming from different licensers for in each case different software or data can be utilized, whereby the use of the Private Serial Key ensures that the installation, modification, and deletion of license parameters can take place only at the one licensee and not at other licensees, because they do not have the identical Private Serial Key SK. For this reason, a manipulation of the license parameters is not possible, because these cannot be decoded. This makes it possible to carry out the license parameters in insecure transmission paths such as the Internet, for example, without this causing a loss of security for the licenser.

An additional great advantage of the procedure in accordance with the invention is that the licensee of a copy-protected software, that is, the end customer, must employ just a single procedure even if he wants to use a multitude of different software items from several different licensers. This not only substantially reduces the costs of the copy protection for both the licenser and the licensee but also raises in particular the acceptance at the licensee.

The security of the procedure for the licenser is further increased when the secret Private Serial Key is produced randomly at the licensee, indeed without the licenser, the licensee, or anyone else being able to influence that.

Preferably the licensee is firmly assigned a unique serial number and the signature of the transmission of the license parameters from the licenser to the licensee occurs dependent on this serial number.

In an advantageous development of the procedure in accordance with the invention, each licenser is assigned a secret Firm Common Key by the producer of the procedure. Through an encoding dependent on the Firm Code of the respective licenser, this is calculated from a secret Common Key, which is also not revealed to the licenser. Each licenser receives only the Firm Common Key that fits his Firm Code. The Firm Common Key is needed to verify the installation, changing, or deletion of license parameters.

Preferably the storage of the license parameters occurs inside a protective device (box) developed as a hardware supplement, which is linked to an interface of the computer of the licensee. This protective device contains the decoder necessary for the automatic decoding of the protected software or data.

Not only to secure computer software or computer-readable data against unauthorized use but also to bill for its use dependent on the intensity of the use, a limiter can be provided for the licensee that limits the time period and/or the number of decodings of the protected software or data. In this connection, a date and/or time information can be transmitted from a reference source to the licensee in an optimum way secure from manipulation. Preferably this limiter is likewise a component of the protective device.

In a further advantageous configuration of the procedure in accordance with the invention, a secret Private Box Key determined by the producer, who makes available a Public Box Key, is stored in the protective device. The producer likewise makes available a list of valid Public Box Keys. The Private Box Key is not dependent on the licensee and licenser and can therefore be used for software or data of different licensers. The Public Box Key calculated from the Private Box Key is used for the encoding of the transmission of license parameters between the licenser and licensee. By checking the validity of the Public Box Keys, one prevents an attacker from delivering any Public Box Key that he has ascertained from an invalid Private Box Key selected by him and thereby decoding the data transmitted by the licenser.

A protective device in accordance with the invention includes an arrangement that contains a random secret Private Serial Key for the encoding of the transmission of the license parameters between the licenser and licensee. If the memory in the protective device includes several memory areas for the storage of license parameters of different licensers, then the same protective device can be used by the licensee in connection with software or data of a multitude of different licensers.

A particularly large degree of security for the licenser can be achieved in that the microprocessor, the memory for the license parameters, the decoder, and the installation for the production of the Private Serial Key are developed on a single integrated semiconductor circuit, especially an ASIC (Application Specific Integrated Circuit). In this way, one prevents in particular the possibility of direct manipulation of the memory with the stored license parameters.

A use-dependent accounting with the licenser is possible if the protective device also includes a limiter secure against manipulation that limits the time period and/or the number of decodings of the protected software or data.

An embodiment example of the invention is explained in more detail below through the enclosed figures and lists.

BRIEF DESCRIPTION OF THE SEVERAL VIEWS OF THE DRAWINGS

FIG. 2a is a diagram showing the keys and data at the producer of the procedure and protective device in accordance with FIG. 1;

FIG. 2b is a diagram showing the keys and data at the licenser;

DETAILED DESCRIPTION OF THE PREFERRED EMBODIMENTS

Figure 1:
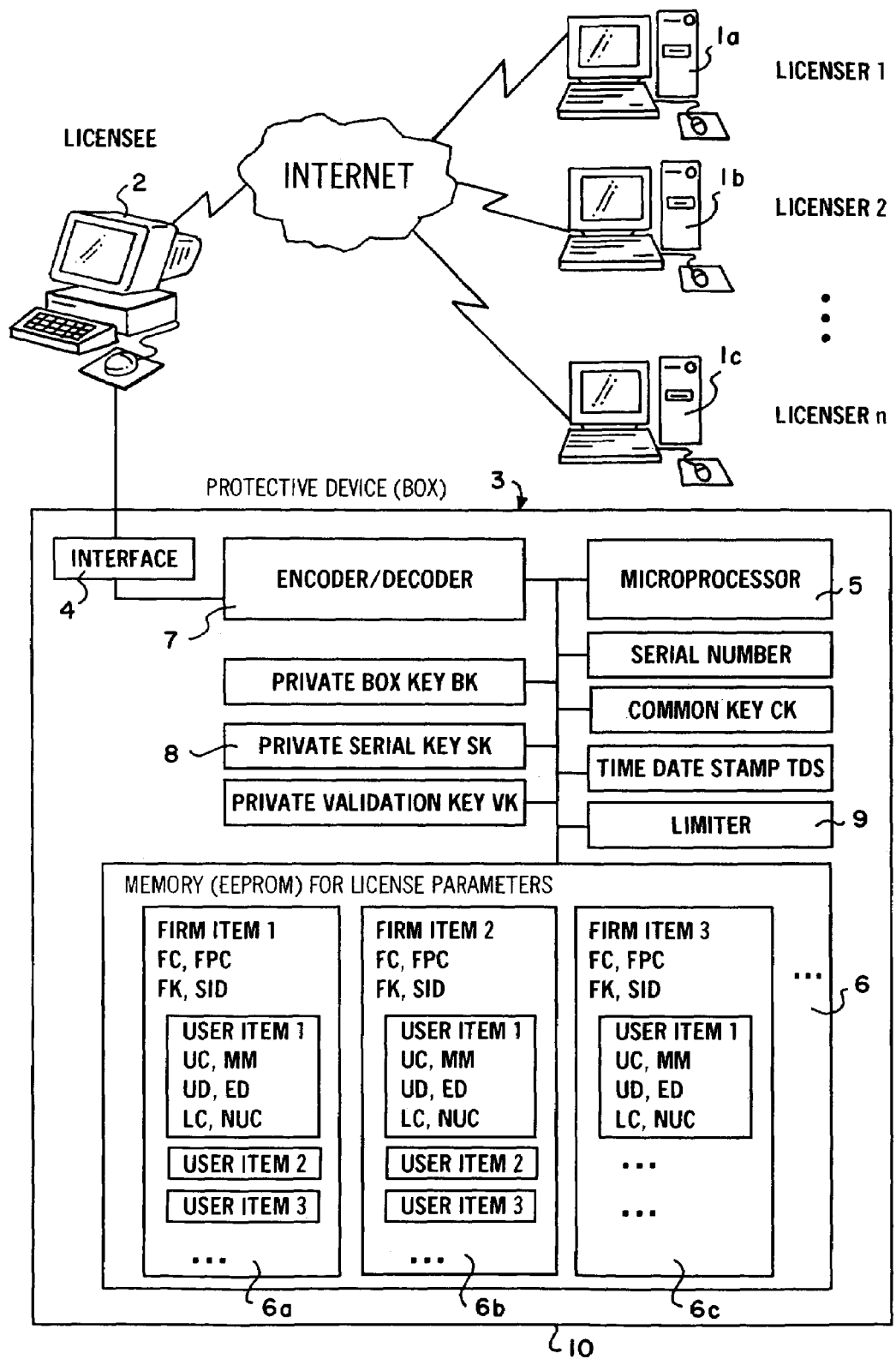
FIG. 1 is a diagram showing a procedure for the protection of computer software and/or computer-readable data including accounting for their use by employing a protective device developed as a hardware supplement.

The procedure schematically presented in FIG. 1 makes possible both the protection and the use-dependent accounting of computer software and/or computer-readable data of a multitude of licensers 1, 2, to n. The software or data is/are first stored on servers of the licenser and can be downloaded through the Internet to the computer of a licensee.

On the computer of the licensee is a protective device (box) 3 developed as a hardware supplement that is linked through an interface 4 to the computer 2 of the licensee.

The protective device 3 includes a microprocessor 5, and a nonvolatile memory (EEPROM) with several memory areas 6a, 6b, 6c, the number of which corresponds to the number of the licenser 1, 2, to n.

The protective device 3 also includes an encoder and decoder 7 as well as an installation 8 for the production of a random secret Private Serial Key SK. A limiter 9 is also foreseen to limit the time period and/or the number of the decoding of the protected software or data.

All essential parts of the protective device 3, hence in particular the microprocessor 5, the memory 6, the encoder and decoder 7, and the installation 8 for the production of the Private Serial Key SK, are developed on a single integrated semiconductor, a so-called ASIC (Application Specific Integrated Circuit), which is surrounded by a stable housing 10 made of plastic, for example.

The following will describe which keys and data are produced and stored at the producer, the licenser, or the licensee and whether these are secret or public.

The list of FIG. 2a includes the keys and data at the producer of the procedure and the protective device. This includes a secret Common Key (CK), which is used for the production of a secret Firm Common Key (FCK) for a particular licenser. The producer also selects a Private Box Key (BK), which is secret and makes available a Public Box Key derived from it. The Private Box Key (BK) is independent of the licensee and can be identical for the use of the procedure with every licenser. The Public Box Key is used for the encoding of the sequence for the installation or deletion of license parameters that are transmitted from a licenser to a licensee. Not absolutely necessary is a secret Private Validation Key (VK) selected by the producer. The associated Public Validation Key is stored at the producer. The licenser can decide whether or not the functionality should be used with the Validation Key (VK). The Validation Key (VK) is used to transmit reference information such as, for example, the current date and time from a reference source, e.g., a trust center, to the licensee securely encoded against manipulation.

In accordance with the list of FIG. 2b, a licenser has the public Firm Code (FC) that the producer makes available to him. The producer makes the secret Firm Common Key (FCK) available to the licenser for his Firm Code (FC). The licenser can freely set his own secret Firm Key (FK) independently of the producer. The Firm Key (FK) is used as a secret key for the installation and modification of license parameters of the licenser and as a secret key for the creation of an encoding sequence. The licenser also has a Public Box Key (BKp) made available by the producer.

Figure 3:
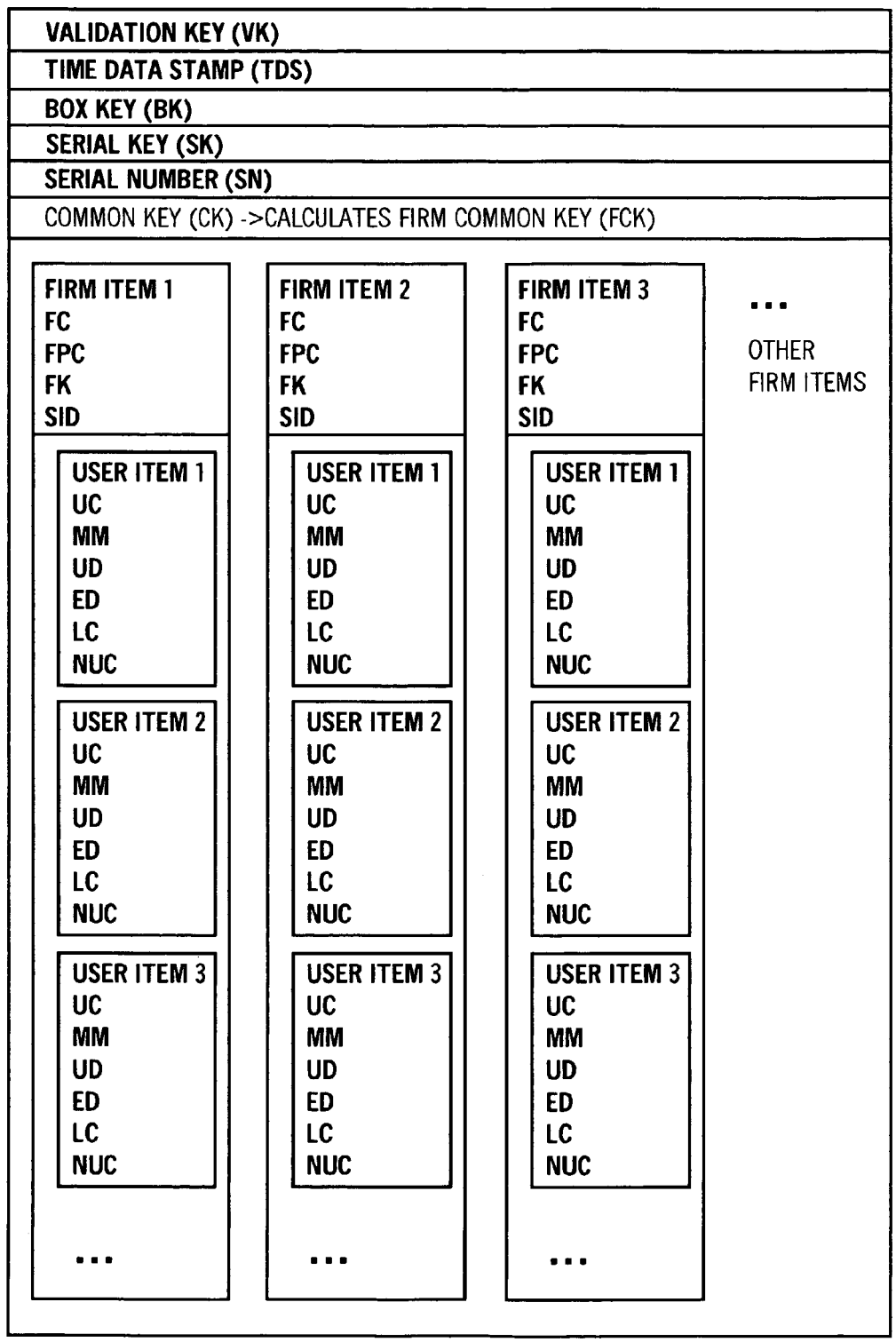
FIG. 3 is a diagram showing the keys and data at the licensee.

The list of FIG. 3 includes the keys and data that are contained in the protective device (3, see FIG. 1) at the licensee. This initially includes a secret unique Private Validation Key (VK) that was selected by the producer of the protective equipment 3.

optionally date and time information (Time Date Stamp, TDS) can be transmitted secure from manipulation from a reference source to the licensee. The Validation Key (VK) is needed for this. Also at the licensee is the secret Private Box Key (BK), whose Public Box Key (BKp) was made available publicly by the producer of the protective device.

Especially important for security is the Private Serial Key (SK) randomly produced at the licensee, which is completely independent both of the producer and of a licenser. This Private Serial Key (SK) makes available a Public Serial Key (SKp), which is used for the encoding of the data transmission between the licenser and licensee.

The licensee also has the unique Serial Number (SN) as well as the secret Common Key (CK) from which the Firm Common Key (FCK) is calculated through an encoding dependent on the Firm Code (FC).

The memory 6 of the protective device 3 at the licensee (see FIG. 1) includes in the three memory areas 6a, 6b, and 6c shown here as an example the license parameters needed for the use of the protected software or data. These license parameters consist of a Firm Item (FI) for each licenser and one or more User Items, which in each case are assigned to a Firm Item.

Firm Items 1, 2, and 3 consist in each case of the Firm Code (FC) of the respective licenser, a Firm Programming Counter (FPC), the secret Firm Key (FK) of the concerned licenser, and a public temporary Session ID (SID).

The several User Items which are each assigned to a Firm Item include in each case a User Code (UC), a Master Mask (MM) for the variable availability for different program modules, functions, etc., User Data (UD), an expiration date (ED), a Limit Counter (LC), and a Network Use Counter (NUC).

Described below are the steps relevant to security in the application of the procedure and the transmission of the keys and data between the licenser and licensee in a public transmission path such as the Internet.

Figure 4:
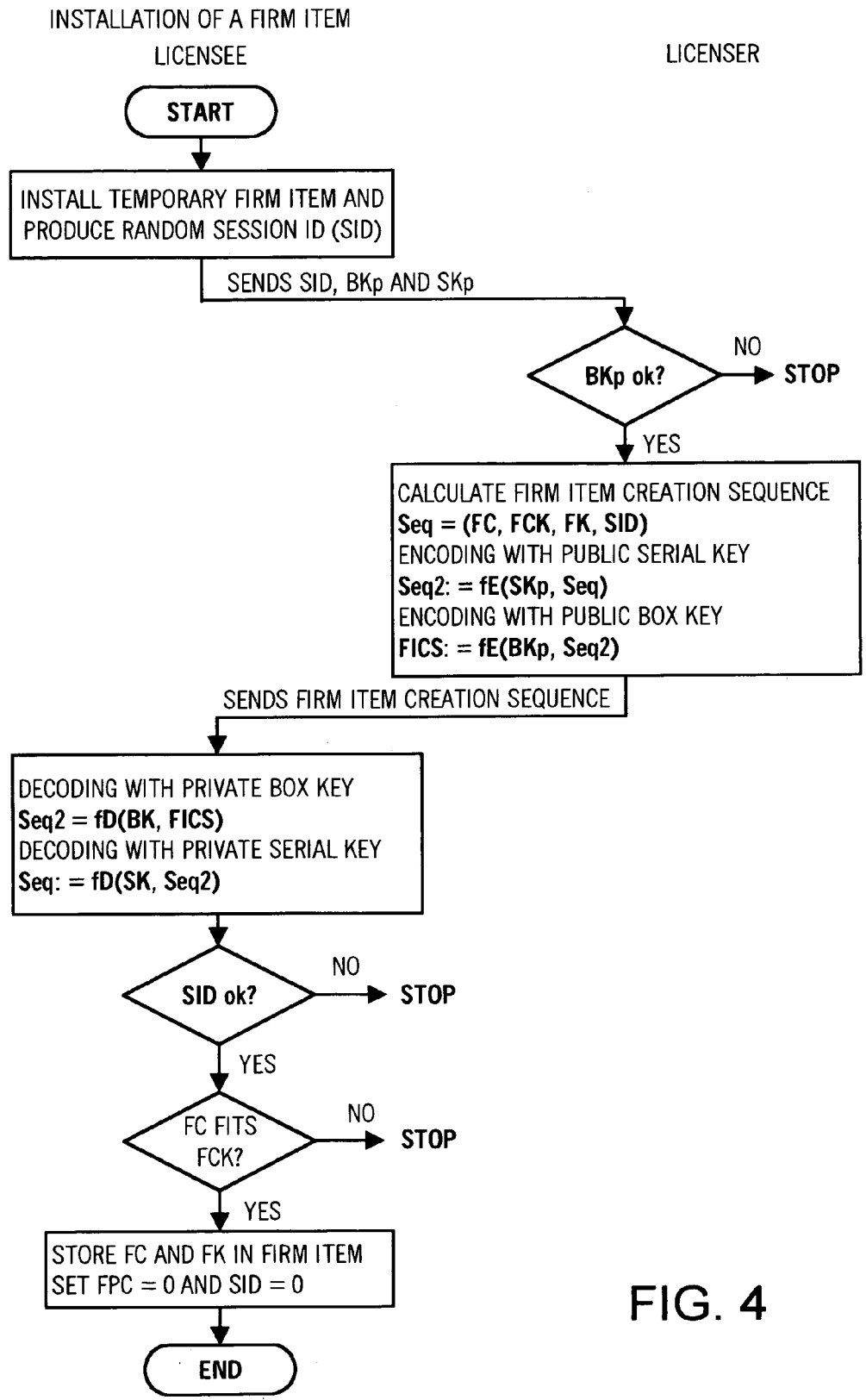
FIG. 4 is a flow chart of the installation of a license parameter by a new licenser.

For the use of the protected software or data, the licensee needs valid license parameters that include a Firm Item and a User Item. The flow chart in FIG. 4 explains the installation of a new Firm Item at the licensee.

Initially a temporary Firm Item is installed and a random Session ID (SID) is produced in the protective device of the licensee. This Session ID (SID), the concerned Public Box Key (BKp), and the Public Serial Key (SKp) derived from the Serial Key (SK) are then sent through the Internet to the licenser to obtain a Firm Creation Sequence. The use of the random Session ID (SID) prevents the possibility of the later repetition of an operation carried out to install a license parameter at the same licensee.

The licenser now checks whether the Public Box Key (BKp) received from the licensee is permissible. The comparison occurs with a list of the valid Public Box Keys (BKp) that the licenser has obtained from the producer of the protective device. Without this authentication, an attacker could transmit to the licenser any Public Keys for which he has the Private Keys and then learn the licenser's secret Firm Key (FK) included in the Firm Item Creation Sequence.

The licenser now calculates a sequence that is composed of the Firm Code (FC), Firm Common Key (FCK), the Firm Key (FK) selected by him, and the previously obtained Session ID (SID). In the first step, this sequence is encoded with the Public Serial Key (SKp), which previously was transmitted by the licensee. This ensures that the sequence can be decoded only by this licensee, because no one else has the associated Private Serial Key (SK).

In the next step, the so encoded sequence is encoded with the Public Box Key (BKp). Only the licensee has the Private Box Key (BK) to decode the sequence again. This ensures that no unauthorized person can decode the sequence, because he does not know the Private Box Key (BK) necessary for the decoding. The so-encoded Firm Item Creation Sequence is then transmitted to the licensee over the Internet.

In the protective device of the licensee, the received Firm Item Creation Sequence is decoded with the Private Box Key (BK). The Private Box Key (BK) is secret and known only to the producer of the protective device. It is therefore ensured that no potential attacker can decode the Firm Item Creation Sequence that contains the Firm Key (FK) of the licenser.

The previously only half-decoded Firm Item Creation Sequence is completely decoded with the Private Serial Key (SK). The Private Serial Key (SK) was randomly produced in the protective device of the licensee and hence is not accessible to anyone. For this reason, the decoding of the sequence is extremely effectively protected. Other licensees or their protective devices cannot decode the sequence; this is not even possible for the producer of the protective device.

It is then checked whether a temporary Firm Item was installed with the Session ID (SID) contained in the Firm Item Creation Sequence and whether the Firm Code (FC) fits the Firm Common Key (FCK). If not, the Firm Item is not installed. If so, the temporary Firm Item now becomes a permanent and usable Firm Item. The Firm Code (FC) and the secret Firm Key (FK) are stored in the protective device of the licenser. At the same time, a Firm Programming Counter is set at zero.

Figure 5:
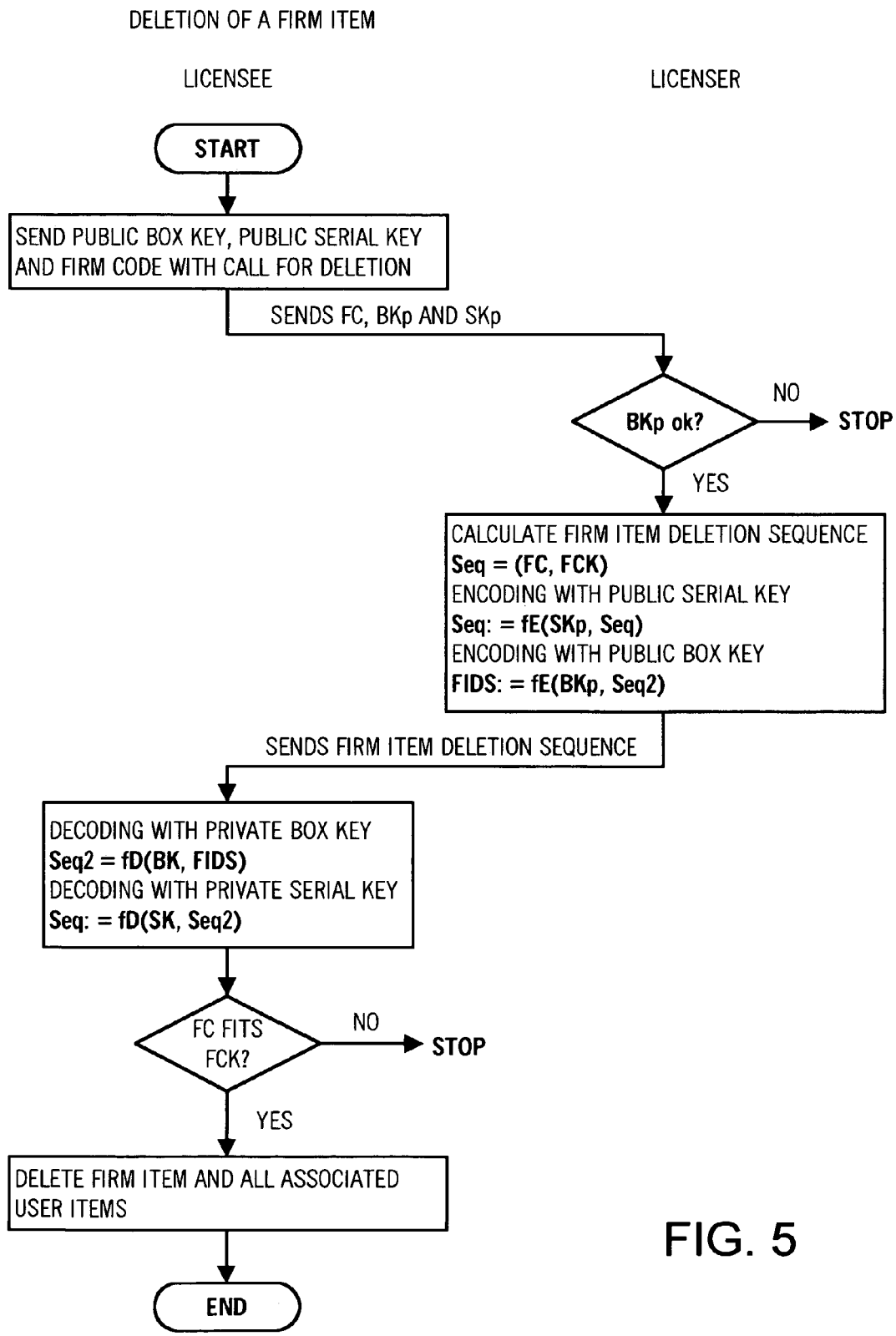
FIG. 5 is a flow chart of the deletion of a license parameter.

The flow chart of FIG. 5 shows how a Firm Item from the memory of the protective device of the licensee is deleted. The deletion of a Firm Item is not relevant to security. For the licensee, however, it is important that the deletion of a Firm Item cannot occur unintentionally or through an unauthorized person.

To complete the license parameters belonging to a certain software, a User Item must be added to a Firm Item. In installation this User Item contains at least the User Code (UC). Optionally the User Item can contain a Master Mask (MM), a limiting counter, an expiration date, a Network Use Counter (NUC), or other added data. The changing of a User Item occurs through the modification of existing parts or the adding of new elements.

Figure 6:
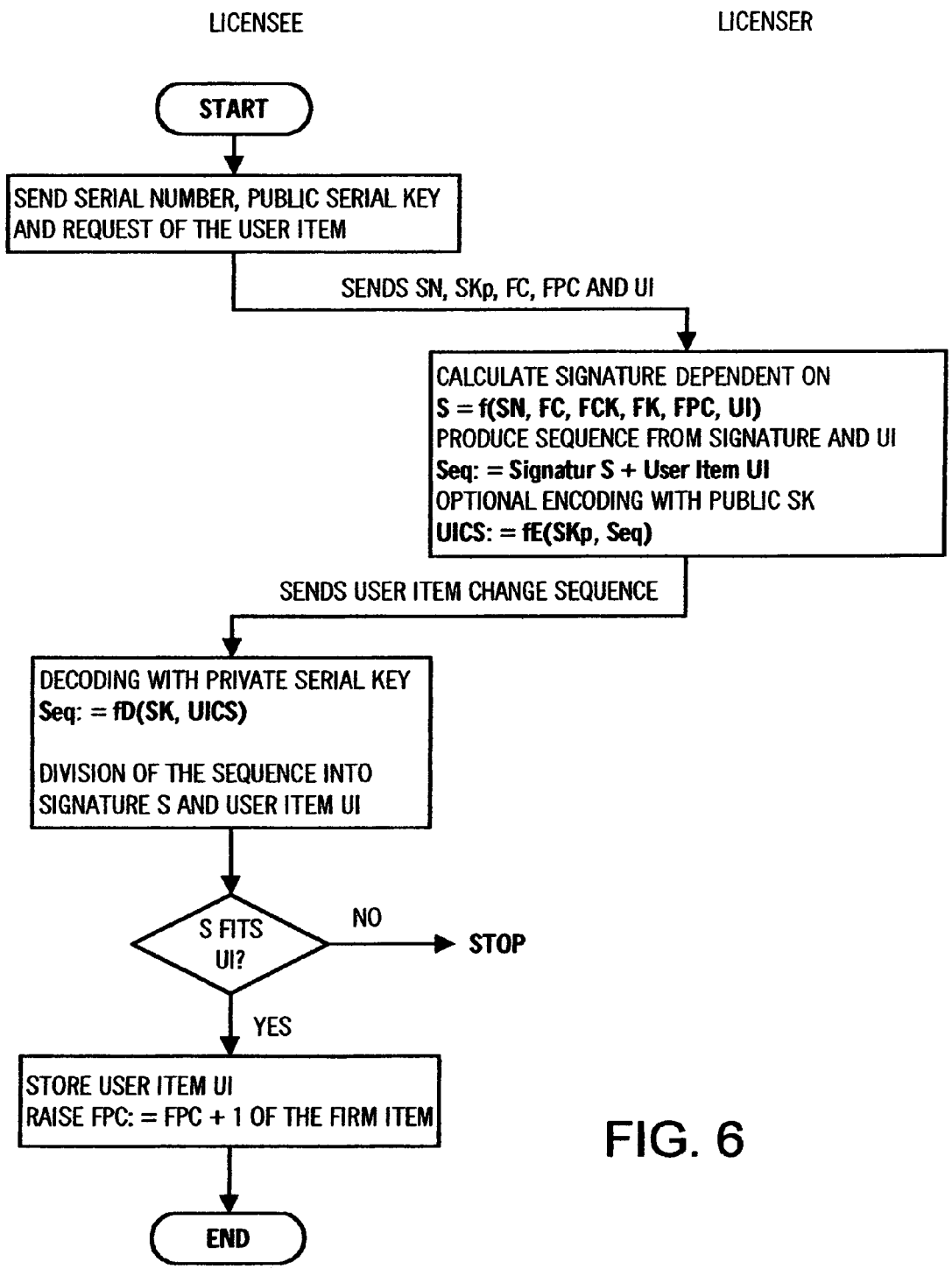
FIG. 6 is a flow chart of the installation, modification, or deletion of a license parameter.

FIG. 6 explains the fundamental steps for the installation, modification, or deletion of a User Item by means of a User Item Change Sequence (UICS).

Figure 7:
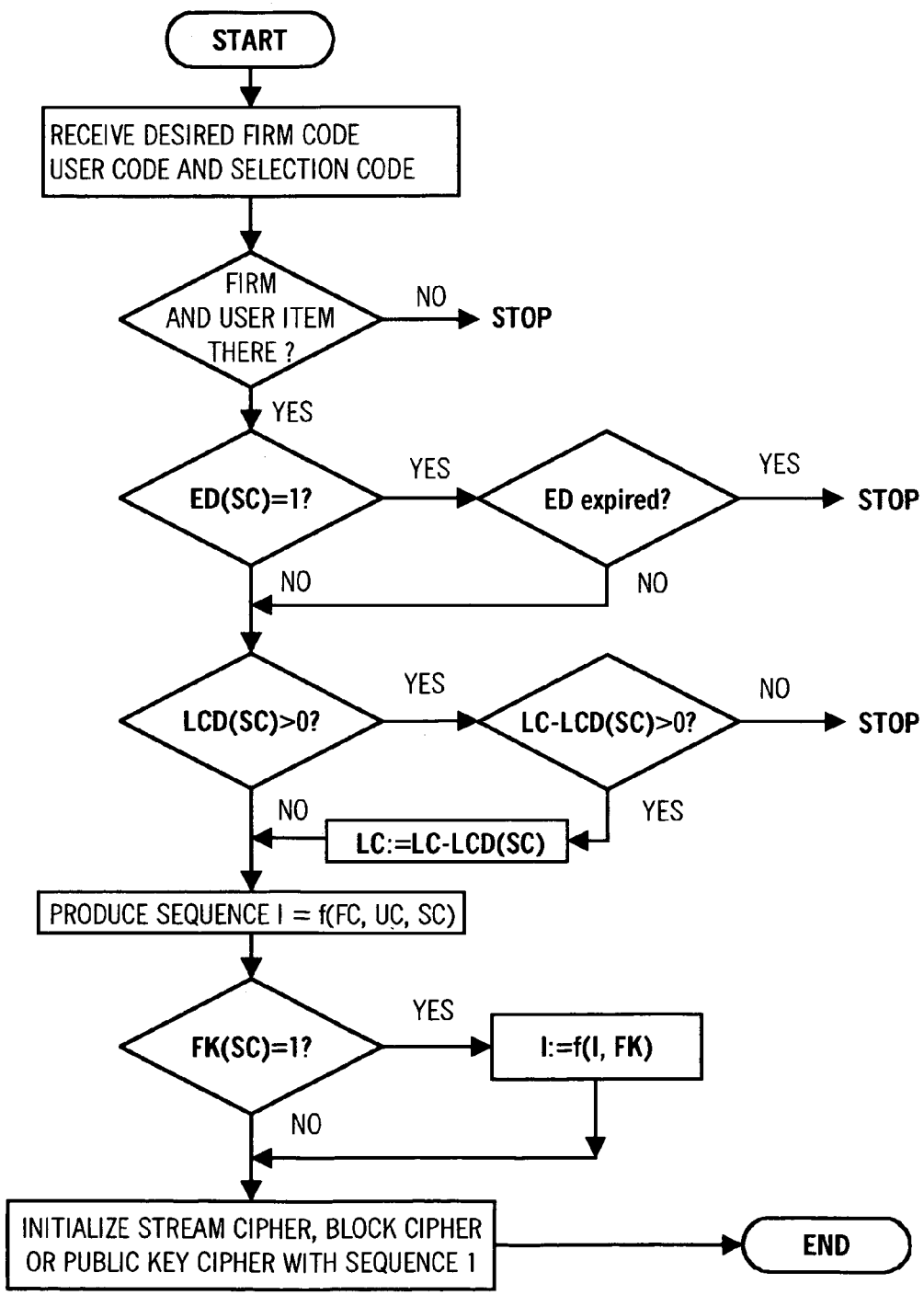
FIG. 7 is a flow chart of the initialization of a decoding at the licensee.

So that the licensee can make use of authorization granted him by the licenser and utilize a protected computer software and/or protected computer-readable data, a decoding must be initialized at the licensee. The process is shown in FIG. 7.

The following keys or data are needed to produce a decoding sequence: Firm Code (FC), User Code (UC), Firm Key (FK), and a Selection Code supplied as a parameter of the protected software.

Depending on the chosen Selection Code, the expiration date is checked and/or the limiting counter is reduced by a certain value. The decoding can be initialized and correctly carried out only if valid license parameters are present that contain the corresponding Firm Code (FC) and User Code (UC) and their limiting counter or expiration date has not run out.

Figure 8:
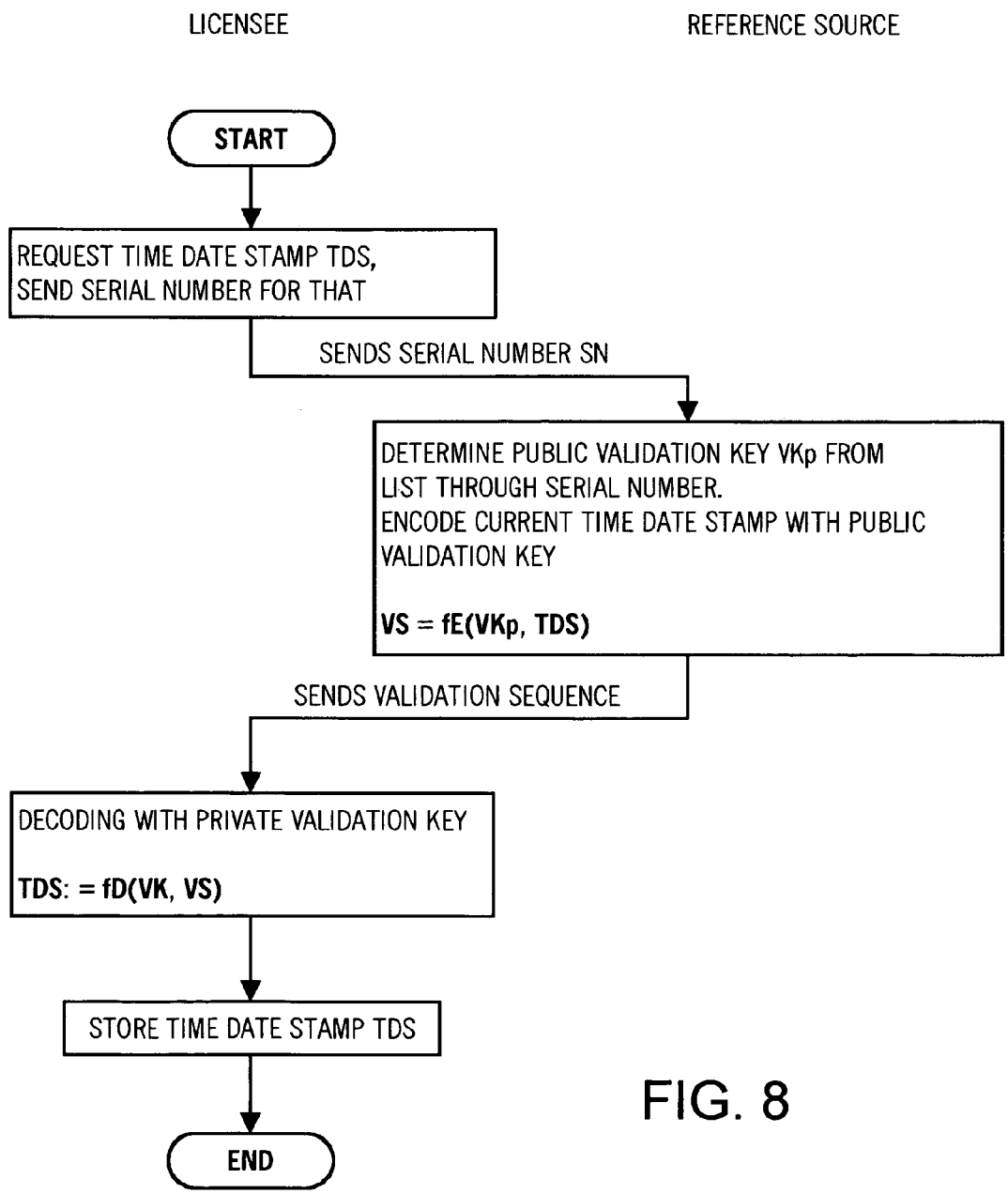
FIG. 8 is a flow chart of the setting of an expiration date.

The flow chart in FIG. 8 explains the setting of a validated time/date information (Time Date Stamp, TDS). This information cannot be manipulated. The limiter (9) uses this information to limit the time period of use of the protected software or data by the licensee.

To set a valid reference time to check the expiration dates, a reference time by date and clock time, which is encoded with the Public Validation Key (VKp) at the licensee, is set by an authorized secure position that has the Serial Number (SN) and the Public Validation Key (VKp). Only the licensee has the Private Validation Key (VK) and can decode this time reference. This ensures that the reference time cannot be changed by an unauthorized person. In addition, the authorized position can block the complete process at the licensee if this is employed as an option by the licenser, for example in the event of abuse by the licensee.

Compilation of the Reference Symbols for FIG. 1
1*a*, 1*b*, 1*c* server of the licenser
2 Computer of the licensee
3 Protective device
4 Interface
5 Microcomputer
6 Memory
6*a*, 6*b*, 6*c* Memory means (of 6)
7 Encoder/decoder
8 Installation for the production of SK
9 Limiter
10 Housing

The invention claimed is:

1. A computer-readable medium comprising a procedure for the protection of information comprising at least one of computer software and computer readable data on a computer of a licensee of said information comprising:
furnishing a protective device to said licensee of said information directly or indirectly from a producer of said device, said device being operably connected to said computer of said licensee;
furnishing a Firm Code by said producer to a licenser of said information;
storing a Private Box Key in said device defined by and known only to said producer to certify said device as being one which is authentic from said producer;
causing said device to generate a Private Serial Key stored in said device to define said device with respect to another one of said device;
transmitting a Firm Common Key from said producer to said licenser, said Firm Common Key being determined by said Firm Code, said Firm Common Key providing for said licenser to transfer license parameters of a license for said information to said licensee;
defining a Secret Firm Key by said licenser and which is known only to said licenser;
transmitting said Secret Firm Key to said device for storage in said device;
causing said device to generate a Public Box Key from said Private Box Key and a Public Serial Key from said Private Serial Key;
transmitting said Public Box Key and said Public Serial Key to said licenser;
generating license parameters by said licenser using said Firm Code, said Secret Firm Key and said Firm Common Key;
encoding said licenser parameters by said licenser using said Public Box Key and said Public Serial Key and transmitting said license parameters to said device;
causing said device to decode said licenser parameters using said Private Box Key and said Private Serial Key;
encoding said information by said licenser with said Secret Firm Key and transmitting said information to said licensee for storage on a data medium of said licensee; and
decoding said information using said Secret Firm Key stored in said device.

2. The computer-readable medium comprising the procedure set forth in claim 1 including the steps of:
validating a matching of said Firm Code and said Firm Common Key with said Private Box Key and said Private Serial Key.

3. The computer-readable medium comprising the procedure set forth in claim 1 including the steps of:
using said Firm Code in combination with said Secret Firm Key to provide the encoding and decoding of said information.

4. The computer-readable medium comprising the procedure set forth in claim 1 including the steps of:
defining a User Code by said licenser;
transferring said User Code to said device; and
causing said User Code to encode and decode said information in combination with said Secret Firm Key and said Firm Code.

5. The computer-readable medium comprising the procedure set forth in claim 1 including the steps of:
defining a Serial Number by said producer and assigned to said device and adding said Serial Number to said Public Box Key and said Public Serial Key for further identifying said device.

6. The computer-readable medium comprising the procedure set forth in claim 1 wherein:

generating said Private Serial Key randomly by said device, said Private Serial Key being known only to said device.

7. The computer-readable medium comprising the procedure set forth in claim 1 wherein:
said device includes a limiter feature secure against manipulation that limits at least one of the time period of said license and the number of decodings of said information.

8. The computer-readable medium comprising the procedure set forth in claim 1 wherein:
said device is provided to include:
an interface for connection with said computer of said licensee;
a microprocessor;
a nonvolatile memory in which said license parameters are stored;
an encoder and decoder connected to said interface for the automatic decoding of said information dependent on said stored license parameters; and
means operable for generating said Private Serial Key.

9. The computer-readable medium comprising the procedure set forth in claim 8 including the step of:
providing said memory to include plural memory areas for storage of license parameters provided by plural different licensers.

10. The computer-readable medium comprising the procedure set forth in claim 8 including the steps of:
providing said microprocessor, said memory, said encoder, said decoder, and said means for generating said Private Serial Key on a single integrated semiconductor circuit.

11. A protective device for use in a procedure for the protection of information comprising at least one of computer software and computer readable data on a computer of a licensee of said information whereby:
said device is furnished to said licensee of said information directly or indirectly from a producer of said device, said device being separate from and operable to be connected to a computer of said licensee;
a Private Box Key is stored in said device defined by and known only to said producer to certify said device as being one which is authentic from said producer;
said device is operable to generate a Private Serial Key stored in said device to define said device with respect to another one of said device;
said device is operable to store therein a Secret Firm Key defined by a licenser of said information and which is known only to said licenser;
said device is operable to generate a Public Box Key from said Private Box Key and a Public Serial Key from said Private Serial Key for transmission to said licensee;
said device is operable to receive encoded license parameters from said licenser using said Public Box Key and said Public Serial Key;
said device is operable to decode said license parameters using said Private Box Key and said Private Serial Key;
said device is operable to decode said information using said Secret Firm Key stored in said device; and
said device includes:
an interface for connection with said computer of said licensee;
a microprocessor;
a nonvolatile memory in which said license parameters are stored;
an encoder and decoder connected to said interface for the automatic decoding of said information dependent on the stored license parameters; and
means operable for the production of a random secret Private Serial Key for the encoding of the transmission of the license parameters between said licenser and said licensee.

12. A device in accordance with claim 11, wherein:
said memory includes several memory areas for the storage of license parameters of different licensers.

13. A device in accordance with claim 11 wherein:
said microprocessor, said memory, said encoder and decoder, and said means for the production of said Private Serial Key (SK) are developed on a single integrated semiconductor circuit.

14. A device in accordance with claim 11 including:
a limiter secure from manipulation that limits the time period and/or the number of decodings of said information.

* * * * *